Aug. 14, 1951   C. S. RICE   2,564,503
BAFFLE MEANS FOR ROTATING BODIES
Filed Jan. 29, 1949
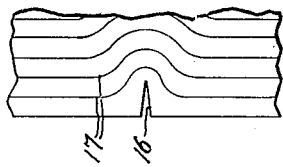
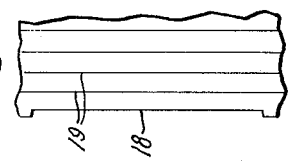
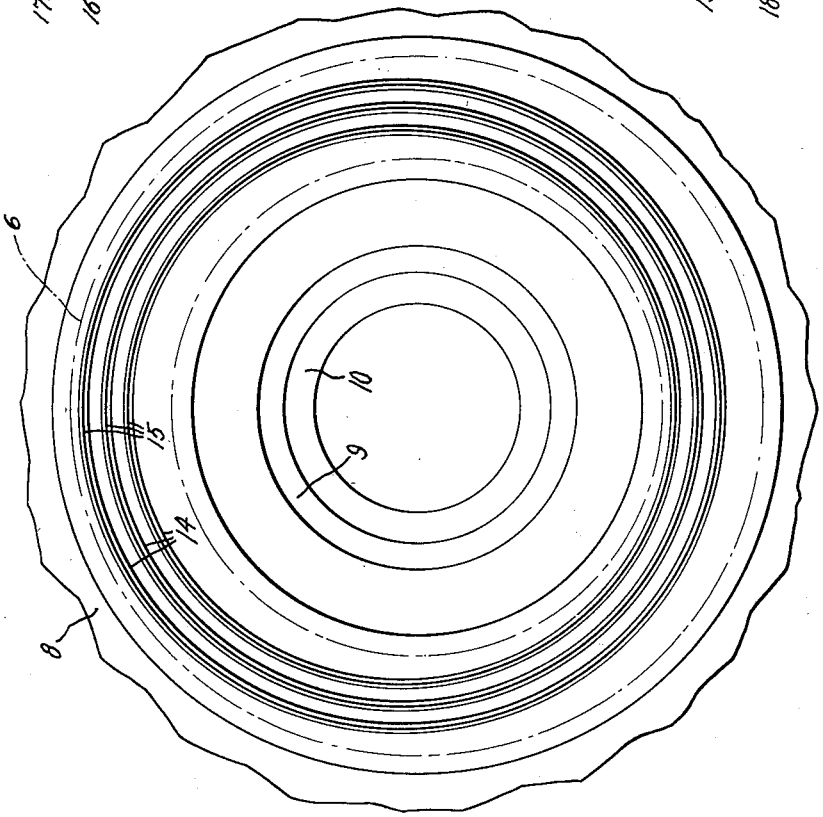
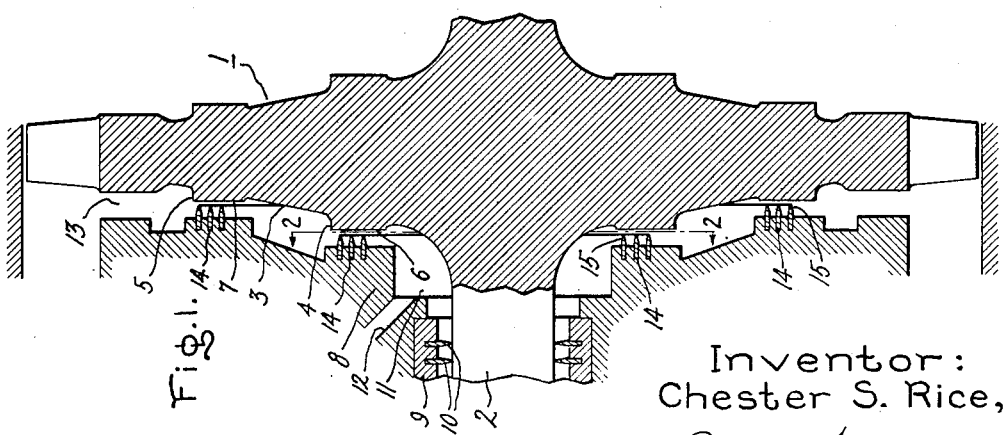
Inventor:
Chester S. Rice,
by Bravell S. Mack
His Attorney.

Patented Aug. 14, 1951

2,564,503

UNITED STATES PATENT OFFICE 2,564,503

BAFFLE MEANS FOR ROTATING BODIES

Chester S. Rice, Schenectady, N. Y., assignor to General Electric Company, a corporation of New York Application January 29, 1949, Serial No. 73,642

3 Claims. (Cl. 286—10)

1

This invention relates to devices for restricting the flow of a fluid along the surface of a rotating body.

In a mechanical device having a rotating member and a fluid flowing along a surface of the rotating member, it is often desirable to restrict the flow of the fluid to accomplish a function associated with the rotating member.

One conventional method of restricting the flow of a fluid along a surface of a rotating member is to provide several groups of rings secured to a stationary member adjacent to a surface of the rotating member and projecting in the direction of the rotating member. Such rings normally are concentric with the rotating axis of the rotating member, and being concentric tend to cut narrow annular grooves in the adjacent surface of the rotating member, in the event that such rings inadvertently engage that surface. The result of narrow grooves being cut in a highly stressed rotating member is the production of dangerously high stress concentration in the area of the narrow grooves.

It is an object of my invention to eliminate high stress concentration in a rotating member while at the same time providing an arrangement for restraining fluid flow along the surface of the member.

In general, my invention comprises a group of rings secured in a stationary member adjacent to the rotating member and eccentric with respect to the axis of rotation of the rotating member.

For a complete understanding of my invention, reference should be had to the following specification and to the accompanying drawing wherein Fig 1 is a cross sectional view of a rotating member showing the application of my invention thereto, Fig. 2 is an enlarged cross sectional view taken on line 2—2 of a portion of Fig. 1, Fig. 3 is a cross sectional view of a limited portion of the rotating member showing the stress effect of a narrow groove, and Fig. 4 is a cross sectional view of a limited portion of the rotating member showing the diminished stress effect produced by use of my invention.

Referring to Fig. 1 in detail, I have shown therein for the purpose of illustrating my invention, a rotating member 1 made of any suitable material such as a metal and secured to a rotating shaft 2. Rotating member 1 has an inclined surface 3 on which spaced projections in the form of rings 4 and 5 are located as shown in Fig. 1. The faces 6 and 7 of respective

2 rings 4 and 5 are perpendicular to the longitudinal axis of shaft 2. Positioned adjacent to rotating shaft 2 and the surface 3 of rotating member 1 is a stationary member 8 made of any suitable material such as a metal. Secured to stationary member 8 is an oil bearing 9 surrounding shaft 2. Oil bearing 9 is provided with oil baffle rings 10 which tend to retain oil within the bearing 9. To aid baffle rings 10 in maintaining oil within bearing 9, a fluid such as a gas under pressure is admitted into a recess 11 through an aperture 12 in stationary member 8. Aperture 12 and recess 11 are located between the bearing 9 and the surface 3 of rotating member 1. The fluid admitted through aperture 12 flows along surface 3 of rotating member 1 to an outlet 13 located between the upper portions of rotating member 1 and stationary member 8. To retain the pressure of the fluid once it is admitted to recess 11 and thereby prevent the leakage of oil from bearing 9, a conventional structure may be used. In this structure several groups of baffle rings 14 are secured to stationary member 8 (adjacent to the faces 6 and 7 of concentric rings 4 and 5 on rotating member 1) and aligned concentrically with respect to the longitudinal axis of shaft 9. Such an arrangement causes the fluid to pass around each of the baffle ring tips 15 and thereby maintains the fluid pressure in recess 11.

The difficulty encountered with this conventional structure for maintaining pressure in recess 11 is that should faces 6 and 7 or rotating member 1 engage the tips 15 of baffle rings 14, narrow grooves producing concentrated stresses will be cut in faces 6 and 7 of rotating member 1 and such concentrated stresses thereby produced will tend to break rotating member 1 when the latter is rotated. For example, referring to Fig. 3, I have shown therein a cross sectional view of a narrow groove 16 made by such a concentric baffle ring. It will be noted in Fig. 3 that the stress lines 17 curve sharply in the area adjacent to groove 16. Such a groove as 16 is likely (when the rotating member 1 is rotated) to develop a crack growing in a direction away from the tip of groove 16 and thereby cause rotating member 1 to break.

To eliminate this concentrated stress in rotating member 1 in accordance with my invention, I secure the baffle rings 14 to stationary member 8 in positions eccentric to the longitudinal axis of shaft 2, as shown in Fig. 2, so that each ring comprises arcuate portions disposed eccentric relative to the axis of rotation. In such positions, the tips 15 of rings 14 will, if they engage the faces 6 and 7 of rings 4 and 5, no longer cut deep narrow grooves in the ring faces, but will by their eccentricity with respect to the longitudinal axis of shaft 2, develop a wiping action against the faces 6 and 7 of rings 4 and 5. This wiping action results merely in a wearing off of the ring tips 15 rather than cutting any appreciable metal from the rotating member 1. In any event, whatever metal may be cut from faces 6 and 7 is cut over a relatively large annular area, as shown in Fig. 4. That is, at worst, a wide groove of very little depth such as groove 18 shown in Fig. 4 will be formed. Comparing the stress lines 19 formed by this groove with the stress lines 17 resulting from the narrow groove 16, it is evident that the stress adjacent to groove 18 is considerably less concentrated than the stress adjacent groove 16.

Thus, I provide an improved arrangement for restraining a fluid flow along a surface of rotating member which does not produce high concentration stresses in the rotating member.

While I have shown, for the purpose of illustrating my invention, a fluid restraining means arranged to maintain a pressurized area to prevent leakage of oil from an oil bearing, it is to be understood that many other functions may be accomplished by such a fluid restraining means and that the particular function illustrated has been used merely to explain the principle involved in my invention.

Moreover, while I have shown and described a particular embodiment of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a device having adjacent members arranged to rotate one with respect to the other about a common axis and a fluid flowing between said members, an annular surface on one of said members, said annular surface being perpendicular to and surrounding said axis, a metal ring projecting from another of said members in the direction of and normally forming a close clearance with said annular surface, said ring surrounding said axis and arranged eccentric thereto to provide upon accidental engagement of said ring and said annular surface a wiping action on the latter to increase the wearing area of said annular surface and minimize a grooving effect thereon otherwise resulting.

2. In a device having a rotating body, an adjacent stationary member, and a fluid tending to flow between the two, means for resisting said fluid flow including an annular radial surface on said rotating body concentric with the axis of rotation thereof, a metal ring projecting from said stationary member in the direction of said annular surface and normally forming a close clearance therewith, said ring surrounding and being eccentric to said axis of rotation to produce, upon accidental rubbing of said ring on said annular surface, a wiping action on said annular surface to increase the wearing surface thereof and minimize a grooving effect thereon otherwise resulting.

3. In a machine having adjacent members arranged for relative rotation about a common axis with a fluid tending to flow between said members, fluid sealing means comprising an annular surface formed on one of the members, said surface being normal to and surrounding the axis of rotation, at least one metal ring member projecting from the other of said members in the direction of and ordinarily forming a small clearance space with said annular surface, said ring member being disposed around the axis of rotation and including arcuate portions eccentric relative to said axis, whereby upon accidental rubbing of the ring on the annular surface a wiping action is produced to increase the wearing area and minimize the grooving effect otherwise resulting.

CHESTER S. RICE.

REFERENCES CITED

The following references are of record in the file of this patent:

UNITED STATES PATENTS

| Number | Name | Date |
|---|---|---|
| 1,699,385 | Whittingham | Jan. 15, 1929 |
| 2,108,724 | Nemetz | Feb. 15, 1938 |